(12) United States Patent
Gray

(10) Patent No.: X9712
(45) Date of Patent: Jun. 11, 1836

(54) COFFINS, METALLIC

(76) Inventor: James A. Gray

James A. Grant Richmond Virginia

Letters Patent

The Schedule referred to in these Letters Patent and making part
of the same containing a description in the words of the said James A.
Grant himself of his improvement in making air tight metallic
Coffins To all to whom these presents shall come
Be it known that I James A Grant of Richmond in the County of
Henrico and State of Virginia have invented a new and useful improvement
in the manner of making Coffins and securing them, and that the following
is a full and exact description of the manner of constructing and [illegible]
said improvements as invented by me — It consists in making
the case or Coffin of metal. and then entirely excluding any communica-
tion with the interior by means of the application of a cement. to be ad-
ditionally secured by the use of solder. In order to adapt the shape
of the coffin to the application of the cement. I construct a groove all
around the sides and ends in their upper and inner edges so as to form
a countersinking into which the lid is to drop upon the cement. which
it is to have been previously applied by spreading. As my object
is to prevent the escape of any disagreeable effluvia from the body con-
tained within as well as for greater strength and security I adapt
the use of metal for the constructing of my coffins. Any kind will
answer but I should prefer Zinc as possessing more strength and
firmness than lead and yet being susceptible of being more easily
secured by a solder than either iron or brass &c. They may be form-
ed either of sheet metal or cast in the ordinary manner of hollow
ware and will be evidently susceptible of such ornaments or devi-
ces in the process as may be desired. In the case of small sized
ones I use a moulding around the extreme edge of the lid when it
will be necessary that the soldering should be done, around the side
of it to prevent disfiguring the pattern and would be sometimes inconvenient in those used for full size In the latter case it will
be better that the lid should be countersunk simply & then can be
soldered on the top, should it be thought necessary in short and
at a few additions as braces may be used in the inside. or
amongst the ornaments on the outside The construction being
thus explained It remains to show the nature and application
of the cement which I compose of the following ingredients viz. equal
parts of Russian Rosin and fine sharp sand or brick dust.
If sand is used it should be properly divested of its fine or dusty
particles. In order to apply it a warm knife or other such
heating instrument is all that is necessary as it may in that manner
be spread all along the countersinking and nothing more is neces-
sary to do but to drop the lid into its place & the cement will
adhere to both lid and Coffin so securely as to effectually exclude
water and air from entering. When zinc is used, the application
of the soldering iron all around the joint will be an additional
security. and in this manner is produced a perfectly tight and secure
Coffin which may be kept in any situation without occasioning in-
convenience to the living from the decomposition of the dead.
What I claim as my invention and for which I now ask letters patent
is, the manner of constructing metallic Coffins, as above described in
rendering them air and water tight by means of cementation and soldering.
In testimony that the above is a full description of my improve-
ment as invented by me I have hereunto set my hand this [illegible]
day of April in the year Eighteen Hundred & thirty six Exd. Witnesses
1146 Henry Thomas
B. K. Morsell James [illegible] Grant.

[illegible]